US012790176B2

(12) United States Patent
Wang et al.

(10) Patent No.: US 12,790,176 B2
(45) Date of Patent: Nov. 10, 2026

(54) STEEL BELT GUIDE WHEEL ASSEMBLY MADE OF NYLON MATERIAL

(71) Applicant: CHINA JILIANG UNIVERSITY, Hangzhou (CN)

(72) Inventors: Qibing Wang, Hangzhou (CN); Shangying Yang, Hangzhou (CN); Gang Xiao, Hangzhou (CN); Jiawei Lu, Hangzhou (CN); Chen Li, Hangzhou (CN); Hao Zhang, Hangzhou (CN)

(73) Assignee: CHINA JILIANG UNIVERSITY, Hangzhou (CN)

( * ) Notice: Subject to any disclaimer, the term of this patent is extended or adjusted under 35 U.S.C. 154(b) by 161 days.

(21) Appl. No.: 18/641,191

(22) Filed: Apr. 19, 2024

(65) Prior Publication Data

US 2025/0270072 A1 Aug. 28, 2025

(30) Foreign Application Priority Data

Feb. 26, 2024 (CN) ......................... 202410207552.3

(51) Int. Cl.
*B66B 15/02* (2006.01)

(52) U.S. Cl.
CPC .................................... *B66B 15/02* (2013.01)

(58) Field of Classification Search
CPC ... B66D 1/26; B66D 1/28; B66D 1/30; B66D 1/36; B66D 3/04; B66D 3/06; B66D 3/08; B66D 2700/0183; B66D 2700/026; B66D 2700/028; B66B 15/02; B66B 15/04; B66B 15/06; F16H 55/36; F16H 55/48; F16H 55/50; F16B 2200/506; F16D 1/033; F16D 1/076; F16L 23/024
See application file for complete search history.

(56) References Cited

U.S. PATENT DOCUMENTS 2,796,748 A * 6/1957 Sheppard ................ F16D 1/033 464/902
4,192,621 A * 3/1980 Barth ...................... F16D 1/033 29/523

(Continued)

FOREIGN PATENT DOCUMENTS

CN 205419412 U * 8/2016
CN 106320285 A * 1/2017 ............... B66D 1/26

(Continued)

*Primary Examiner* — Victoria P Augustine
*Assistant Examiner* — Henrix Soto

(57) ABSTRACT

A steel belt guide wheel assembly includes guide wheels and bearings, wherein the guide wheels are made of nylon, the left and right ends of the wheel surface are respectively provided with a left annular convex wall and a right annular convex wall; a belt groove is formed between the left annular convex wall and the right annular convex wall, the bearings are coaxially installed in a wheel body channel of the guide wheel, and the guide wheels can be detachably connected in pairs by a connecting mechanism or glued together by glue; the assembly has good wear resistance, low noise, light weight and high strength, which prolongs the service life, reduces the manufacturing cost and maintenance cost, helps to reduce the load of elevator system, reduces the load of driving parts, improves the riding comfort of passengers, and can be freely combined as required.

19 Claims, 5 Drawing Sheets

(56) References Cited

U.S. PATENT DOCUMENTS

| | | | | |
|---|---|---|---|---|
| 6,176,663 | B1 * | 1/2001 | Nguyen | F16L 23/036<br>411/537 |
| 6,405,833 | B1 * | 6/2002 | Baranda | B66D 3/08<br>474/151 |
| 6,635,000 | B2 * | 10/2003 | Meindl | B61B 12/02<br>492/47 |
| 10,520,120 | B2 * | 12/2019 | Fraczek | F16L 23/036 |
| 10,773,929 | B2 * | 9/2020 | Ma | B66B 15/02 |
| 10,822,202 | B2 * | 11/2020 | Lee | B66B 15/04 |
| 11,059,699 | B2 * | 7/2021 | Duvall | F16H 55/50 |
| 11,261,062 | B2 * | 3/2022 | Torlai | B66B 15/06 |
| 11,486,474 | B2 * | 11/2022 | Arnault | F16C 33/7886 |

FOREIGN PATENT DOCUMENTS

| | | | | | |
|---|---|---|---|---|---|
| CN | 111927894 | A | * | 11/2020 | F16D 1/033 |
| DE | 202010008215 | U1 | * | 1/2011 | F16B 37/00 |
| FR | 2699845 | A1 | * | 7/1994 | B23P 11/005 |
| JP | 2016169748 | A | * | 9/2016 | |

* cited by examiner

STEEL BELT GUIDE WHEEL ASSEMBLY MADE OF NYLON MATERIAL

CROSS-REFERENCE TO RELATED APPLICATIONS

This application claims priority of Chinese Patent Application No. 202410207552. 3, filed on Feb. 26, 2024, the entire contents of which are incorporated herein by reference.

TECHNICAL FIELD

The present application relates to the technical field of steel belt guide wheels, in particular to the technical field of steel belt guide wheel assemblies made of nylon.

BACKGROUND

With the progress of society and the continuous improvement of people's living standards, elevators appear more and more frequently in people's lives. The existing car elevators generally use guide ropes to connect the counterweight, traction sheave and car. There are usually two kinds of guide ropes, one of which is a cylindrical wire rope formed by winding a plurality of steel wires, and the other is a steel belt formed by coating polyurethane on the outside of a plurality of steel wires after being arranged side by side (such as a steel belt elevator disclosed in the invention patent with a publication patent number of CN110194404B).

Elevator guide wheel is an important part in the elevator system, usually with a guide groove, which is used to guide and support the guide rope to ensure the smooth operation of the elevator. When multiple steel belts are used to lift or lower the car at the same time, it is usually necessary to conFIG. the same number of steel belt guide wheels with only one steel belt guide groove (such as the special guide wheel for a steel belt elevator disclosed in the invention patent with a publication patent number of CN104760861B), or one steel belt guide wheel with the same number of steel belt guide grooves (such as a special guide wheel device for steel belt elevator disclosed in the utility model patent with a publication patent number of CN210558800U). However, the former requires high installation accuracy of each steel belt guide wheel during assembly, otherwise it is difficult to ensure that the tension of each steel belt is consistent, which will lead to a large friction sound due to the gradual deviation of the steel belt during operation, while the latter has the problem of poor adjustment flexibility and cannot be adjusted adaptively according to the number of steel belts.

In addition, the existing steel belt guide wheels are usually made of metal materials, such as cast iron and steel. Although these metal materials have high strength, they have wear and noise problems, lack of self-lubrication, and are easily affected by corrosion. At the same time, the heavy weight also increases the load of elevator system and the manufacturing cost is also high. These shortcomings may adversely affect the performance, noise level, durability and maintenance cost of the elevator system.

SUMMARY

The object of the present application is to solve the problems in the prior art. The steel belt guide wheel assembly made of nylon has the characteristics of good wear resistance, low noise, light weight and high strength, can effectively prolong the service life, reduce the manufacturing cost and maintenance cost, help to reduce the load of the elevator system, reduce the load of the driving parts, improve the riding comfort of passengers, and can be freely assembled as required.

In order to achieve the above object, the present application provides a steel belt guide wheel assembly made of nylon, including guide wheels and bearings, wherein the guide wheels are made of nylon and the left and right ends of a wheel surface are respectively provided with a left annular convex wall and a right annular convex wall, and a belt groove is formed between the left annular convex wall and the right annular convex wall; the bearings are coaxially installed in wheel body channels of the guide wheels, and the guide wheels can be detachably connected in pairs by a connecting mechanism or glued together by glue.

Preferably, the connecting mechanism comprises a fastening bolt and a positioning nut, and the left and right ends of the positioning nut are respectively provided with a positioning internal thread blind hole and a positioning inner hexagon notch; the fastening bolt a fastening outer hexagon screw head and a fastening screw, and one end of the fastening screw is coaxially connected with the fastening outer hexagon screw head, and the other end can be screwed into the positioning internal thread blind hole; a left primary stepped hole and a right primary stepped hole are respectively arranged on the left annular convex wall and the right annular convex wall; a large hole part of the left primary stepped hole (111) can be used for placing the positioning nut and is arranged towards the belt groove; a large hole part of the right primary stepped hole is in a shape of an inner hexagon adapted to the fastening outer hexagon screw head and is arranged towards the belt groove, and small hole parts of the right primary stepped hole and the left primary stepped hole can be penetrated by the fastening screw.

Preferably, the connecting mechanism further comprises an auxiliary bolt, which comprises an auxiliary screw head and an auxiliary screw; one end of the auxiliary screw head is provided with an auxiliary hexagon notch while the other end is coaxially connected with the auxiliary screw; the fastening outer hexagon screw head is provided with a fastening internal thread blind hole into which an auxiliary screw can be screwed; the positioning nut is provided with a positioning internal thread through hole into which the auxiliary screw can be screwed, and the left annular convex wall and the right annular convex wall are respectively with a left secondary stepped hole and a right secondary stepped hole into which the auxiliary bolt can be placed.

Preferably, the positioning internal thread through hole is communicated with the positioning inner hexagon notch.

Preferably, the connecting mechanism further comprises a spacer ring, which is sleeved outside the guide wheel and clings to one side of the left annular convex wall and/or the right annular convex wall facing the belt groove.

Preferably, an annular flange is arranged on the spacer ring, a side body through hole is arranged on the annular flange, and the left annular convex wall and the right annular convex wall are respectively with a left slot and a right slot which are communicated with the left secondary stepped hole and the right secondary stepped hole.

Preferably, the left slot and the right slot are respectively communicated with the small holes of the left secondary stepped hole and the right secondary stepped hole.

Preferably, when the guide wheels are sequentially glued together by glue in pairs, the end faces of the left and right ends of the guide wheels are respectively provided with grid grooves.

Preferably, the bearing comprises an inner ring, an outer ring, a cover, balls and a retainer; the inner ring is coaxially sleeved in a ring channel of the outer ring, and the outer ring is coaxially fixed in a wheel body channel of the guide wheel; the balls are rotatably connected between the inner ring and the outer ring through the retainer, and the left and right ends of the inner ring and the outer ring are respectively closed by the cover.

Preferably, the cove r is sealed by a sealing ring.

The present application has the following beneficial effects.

1) According to the present application, with a comprehensive consideration of the material characteristics and the applicable environment, the nylon material is selected to replace the metal material to manufacture the guide wheel; compared with the metal material, the nylon material is lighter, more wear-resistant, less in friction noise, less prone to corrosion and lower in purchase price, therefore: firstly, the total weight of the elevator system can be effectively reduced, and the load of the elevator system on the building can be reduced; secondly, the elevator can maintain an efficient working state during long-term operation, and the service life of the guide wheel will be prolonged; thirdly, a quieter elevator operation environment is provided; fourthly, the guide wheel is enabled to maintain good appearance and performance; and fifthly, maintenance cost and replacement cost can be saved due to the long service life and high reliability;
2) According to the present application, the connecting mechanism consisting of the fastening bolt, the positioning nut, the auxiliary bolt and the spacer ring is additionally arranged to connect the specified number of guide wheels two by two as required, so that not only can the fastening bolt and the positioning nut be used to realize the initial connection between two adjacent guide wheels, but also the auxiliary bolt can be used to lock the positions of the fastening bolt and the positioning nut to prevent the fastening bolt and the positioning nut from rotating reversely and loosening each other due to vibration and other reasons, and the spacer ring can isolate the fastening bolt and the positioning nut at the belt groove to prevent the steel belt from being connected with the fastening bolt and the positioning nut.
3) According to the present application, the grid grooves are respectively added at the end faces of the left and right ends of the guide wheels, so that a specified number of guide wheels can be glued by glue as required, and the grid grooves can effectively increase the glue solution load and the gluing area between two adjacent guide wheels.

The features and advantages of the present application will be described in detail with reference to the examples with the accompanying drawings.

In the figures: 1—Guide wheel, 11—Left annular convex wall, 111—Left primary stepped hole, 112—Left secondary stepped hole, 113—Left slot, 12—Right annular convex wall, 121—Right primary stepped hole, 122—Right secondary stepped hole, 123—Right slot, 13—Belt groove, 14—Grid groove, 2—Bearing, 21—Inner ring, 22—Outer ring, 23—Cover, 24—Ball, 25—Retainer, 3—Connecting mechanism, 31—Fastening bolt, 311—Fastening outer hexagon screw head, 3111—Fastening internal thread blind hole, 312—Fastening screw, 32—Positioning nut, 321—Positioning internal thread blind hole, 322—Positioning inner hexagon notch, 323—Positioning internal thread through hole, 33—Auxiliary bolt, 331—Auxiliary screw head, 3311—Auxiliary inner hexagon notch, 332, 332—Auxiliary screw, 34—Spacer ring, 341—Annular flange.

DESCRIPTION OF EMBODIMENTS

Example 1

Figure 1:
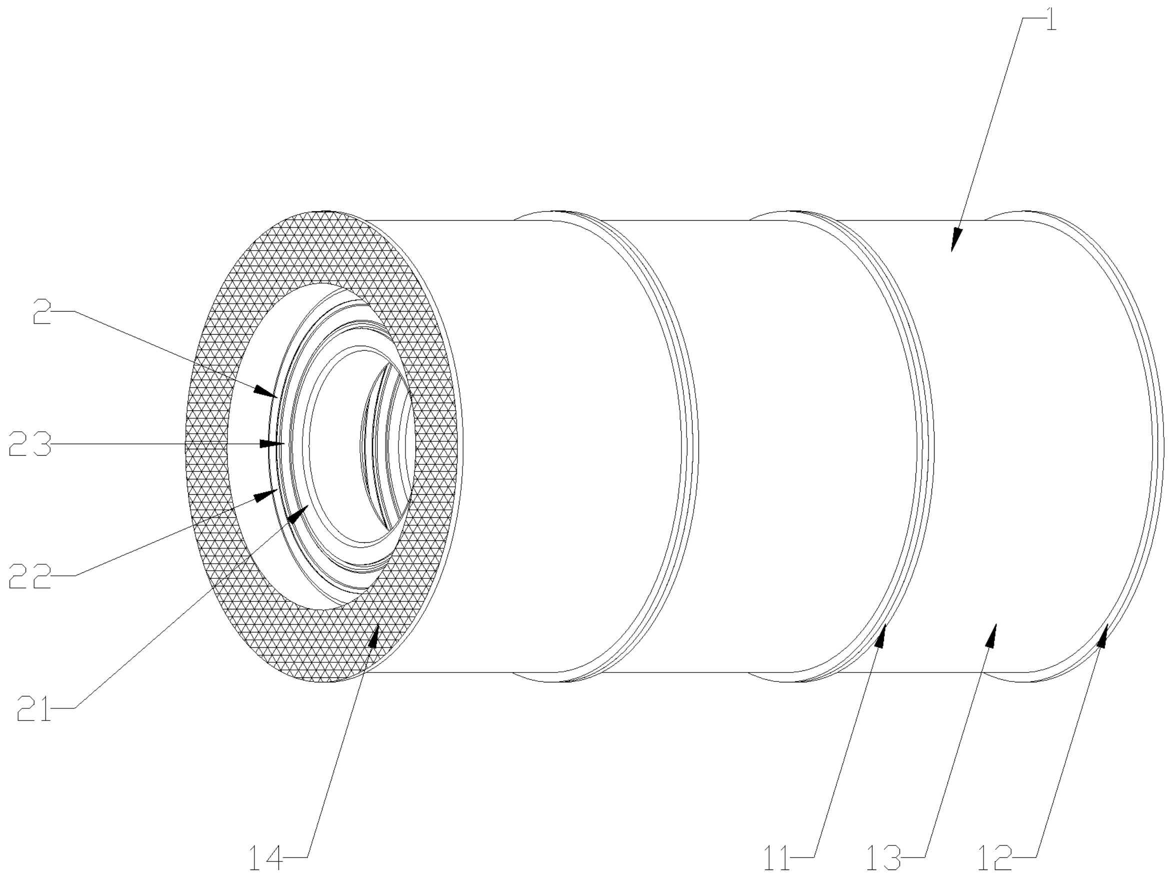
FIG. 1 is a schematic diagram of the three-dimensional structure of Example 1.
Figure 2:
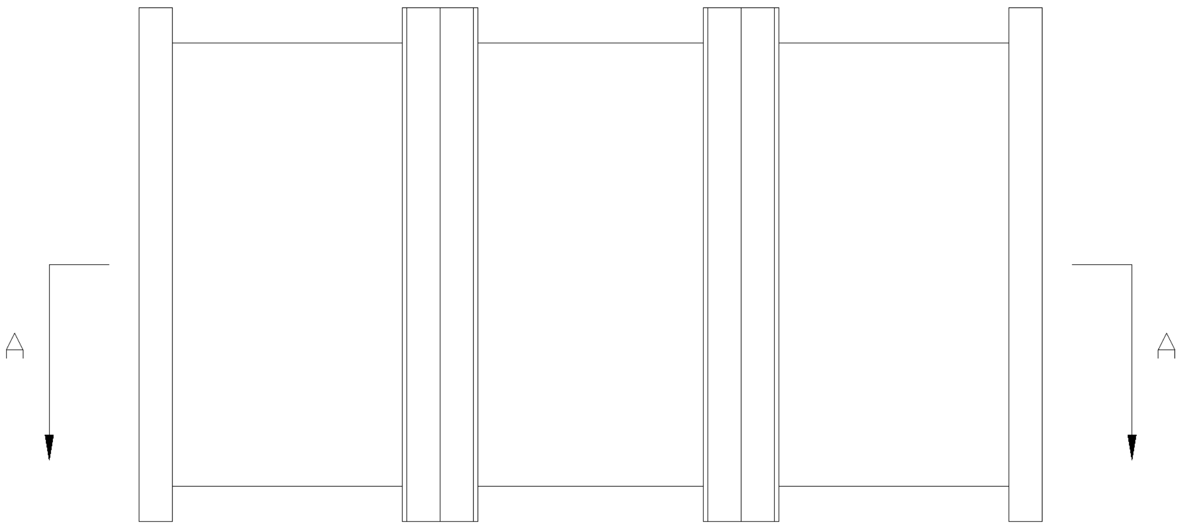
FIG. 2 is a front view of Example 2.
Figure 3:
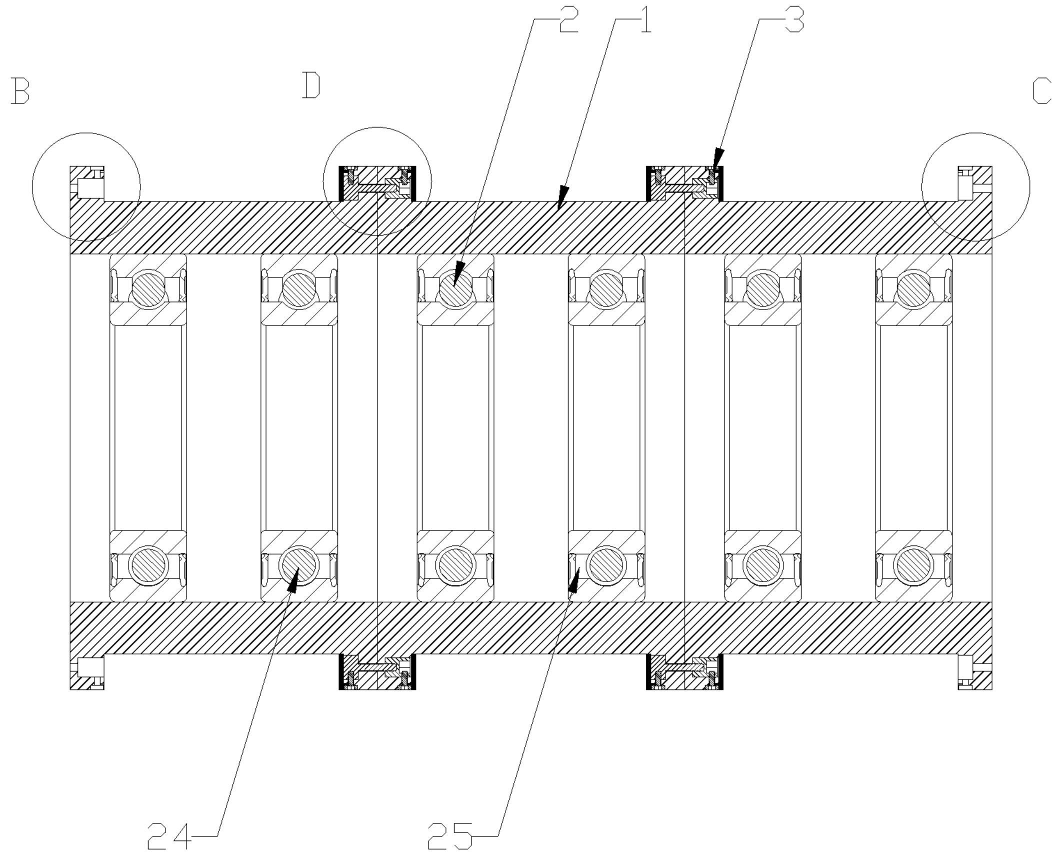
FIG. 3 is a sectional view taken along the line A-A of FIG. 2.
Figure 4:
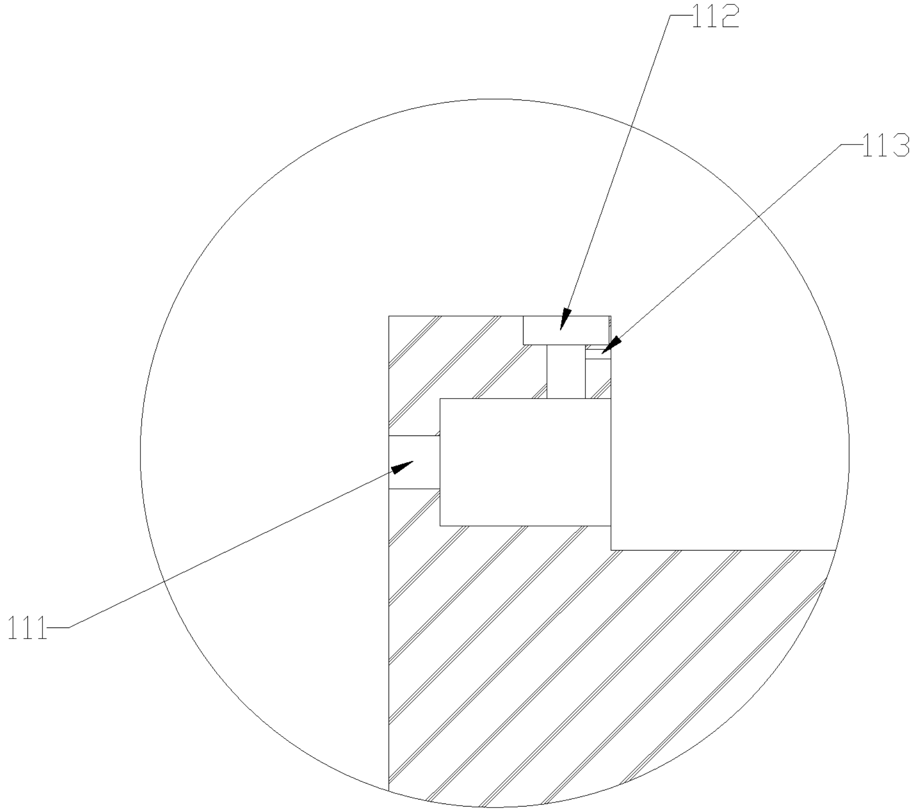
FIG. 4 is an enlarged schematic view at B of FIG. 3.
Figure 5:
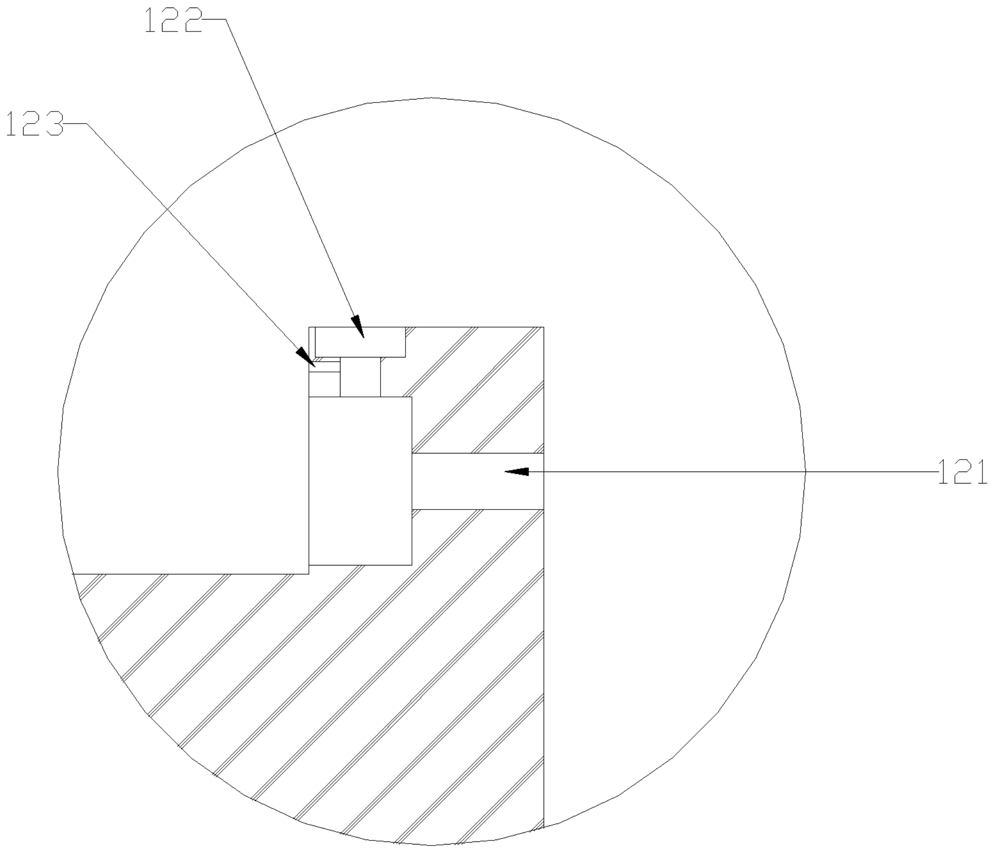
FIG. 5 is an enlarged schematic view at C of FIG. 3.
Figure 6:
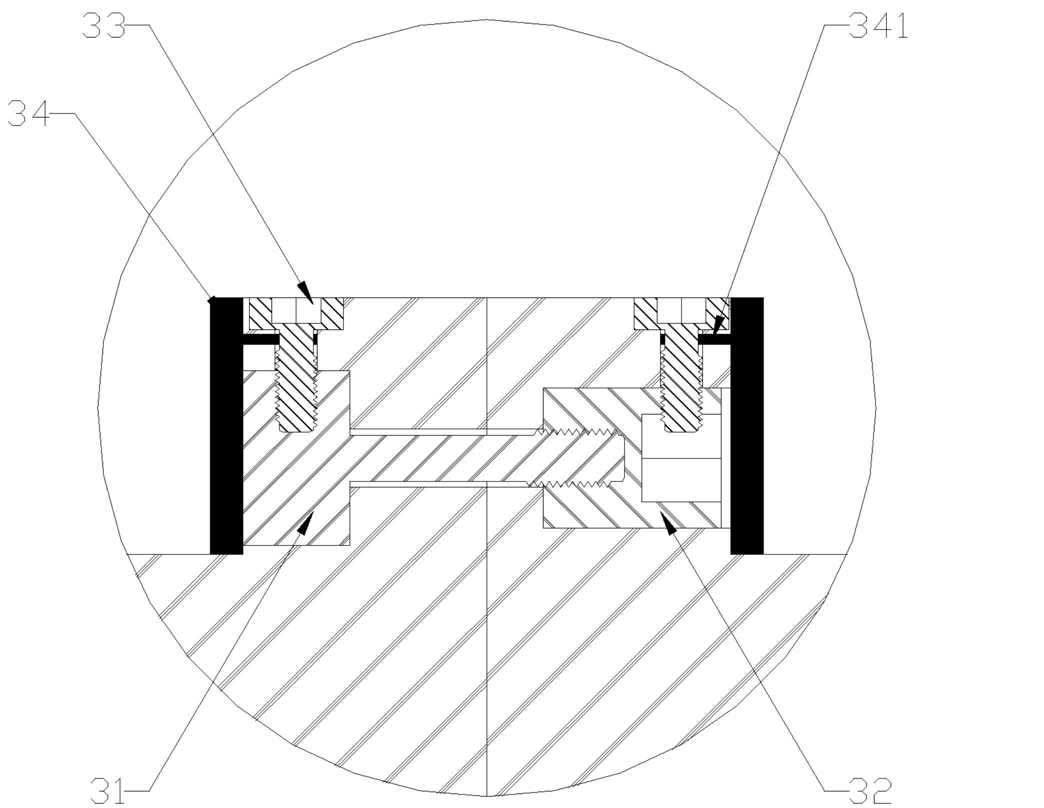
FIG. 6 is an enlarged schematic view at D of FIG. 3.
Figure 7:
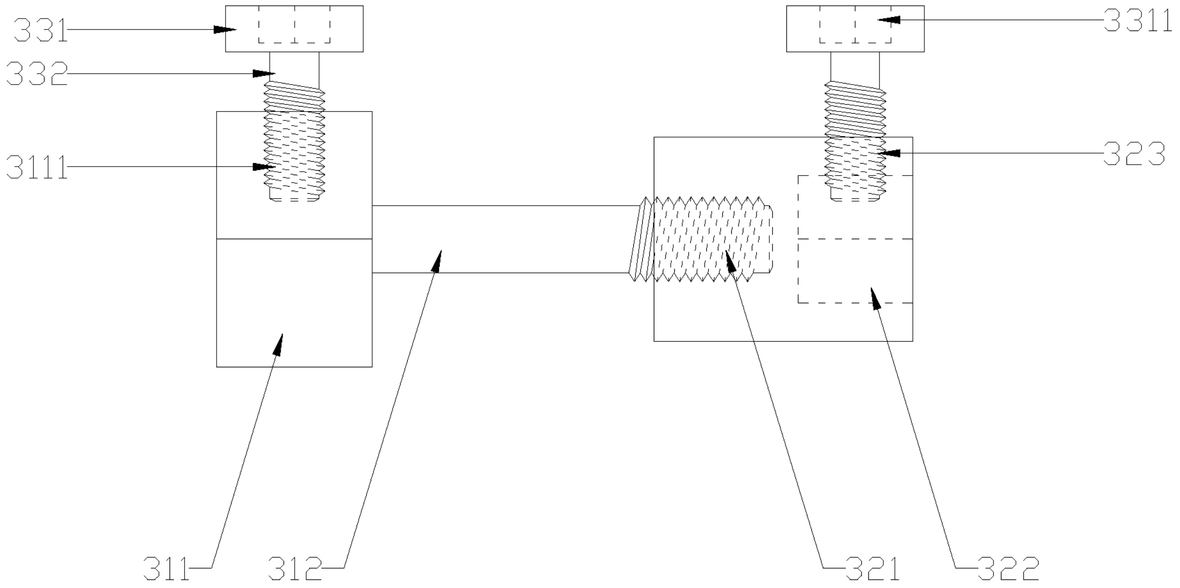
FIG. 7 is a front view of the connecting mechanism of Example 2.

Referring to FIG. 1, the steel belt guide wheel assembly made of nylon of the present application includes guide wheels 1 and bearings 2, wherein the guide wheels 1 are made of nylon and the left and right ends of a wheel surface are respectively provided with a left annular convex wall 11 and a right annular convex wall 12, and a belt groove 13 is formed between the left annular convex wall 11 and the right annular convex wall 12; the bearings 2 are coaxially installed in wheel body channels of the guide wheels 1, and the guide wheels 1 can be glued together by glue in pairs.

The end faces of the left and right ends of the guide wheel 1 are respectively provided with grid grooves 14.

The bearing 2 comprises an inner ring 21, an outer ring 22, a cover 23, balls 24 and a retainer 25; the inner ring 21 is coaxially sleeved in a ring channel of the outer ring 22, and the outer ring 22 is coaxially fixed in a wheel body channel of the guide wheel 1; the balls 24 are rotatably connected between the inner ring 21 and the outer ring 22 through the retainer 25, and the left and right ends of the inner ring 21 and the outer ring 22 are respectively closed by the cover 23.

The cover 23 is sealed by a sealing ring.

Before use, a certain number of guide wheels 1 can be bonded head-to-tail by glue directly as required.

Example 2

Referring to FIGS. 2 to 7, the steel belt guide wheel assembly made of nylon of the present application includes guide wheels 1 and bearings 2, wherein the guide wheels 1 are made of nylon and the left and right ends of a wheel surface are respectively provided with a left annular convex wall 11 and a right annular convex wall 12, and a belt groove 13 is formed between the left annular convex wall 11 and the right annular convex wall 12; the bearings 2 are coaxially installed in wheel body channels of the guide wheels 1, and the guide wheels 1 can be detachably connected in pairs by a connecting mechanism 3.

The connecting mechanism 3 comprises a fastening bolt 31 and a positioning nut 32, and the left and right ends of the positioning nut 32 are respectively provided with a positioning internal thread blind hole 321 and a positioning inner hexagon notch 322; the fastening bolt 31 a fastening outer hexagon screw head 311 and a fastening screw 312, and one end of the fastening screw 312 is coaxially connected with the fastening outer hexagon screw head 311, and the other end can be screwed into the positioning internal thread blind hole 321; a left primary stepped hole 111 and a right primary stepped hole 121 are respectively arranged on the left annular convex wall 11 and the right annular convex wall 12; a large hole part of the left primary stepped hole 111 can be used for placing the positioning nut 32 and is arranged towards the belt groove 13; a large hole part of the right primary stepped hole 121 is in a shape of an inner hexagon adapted to the fastening outer hexagon screw head 311 and is arranged towards the belt groove 13, and small hole parts of the right primary stepped hole 121 and the left primary stepped hole 111 can be penetrated by the fastening screw 312.

The connecting mechanism 3 further includes an auxiliary bolt 33, which comprises an auxiliary screw head 331 and an auxiliary screw 332; one end of the auxiliary screw head 331 is provided with an auxiliary hexagon notch 3311 while the other end is coaxially connected with the auxiliary screw 331; the fastening outer hexagon screw head 311 is provided with a fastening internal thread blind hole 3111 into which an auxiliary screw 332 can be screwed; the positioning nut 32 is provided with a positioning internal thread through hole 323 into which the auxiliary screw 332 can be screwed, and the left annular convex wall 11 and the right annular convex wall 12 are respectively with a left secondary stepped hole 112 and a right secondary stepped hole 122 into which the auxiliary bolt 33 can be placed.

The positioning internal thread through hole 323 is communicated with the positioning inner hexagon notch 322.

The connecting mechanism 3 further includes a spacer ring 34, which is sleeved outside the guide wheel 1 and clings to one side of the left annular convex wall 11 and/or the right annular convex wall 12 facing the belt groove 13.

An annular flange 341 is arranged on the spacer ring 34, a side body through hole is arranged on the annular flange 341, and the left annular convex wall 11 and the right annular convex wall 12 are respectively with a left slot 113 and a right slot 123 which are communicated with the left secondary stepped hole 112 and the right secondary stepped hole 122.

The left slot 113 and the right slot 123 are respectively communicated with the small holes of the left secondary stepped hole 112 and the right secondary stepped hole 122.

The bearing 2 comprises an inner ring 21, an outer ring 22, a cover 23, balls 24 and a retainer 25; the inner ring 21 is coaxially sleeved in a ring channel of the outer ring 22, and the outer ring 22 is coaxially fixed in a wheel body channel of the guide wheel 1; the balls 24 are rotatably connected between the inner ring 21 and the outer ring 22 through the retainer 25, and the left and right ends of the inner ring 21 and the outer ring 22 are respectively closed by the cover 23.

The cover 23 is sealed by a sealing ring.

Before use, a certain number of guide wheels 1 can be connected head to tail directly according to the needs by using the connecting mechanism 3. Specifically, the front and rear guide wheels 1 are assembled first, and then the fastening outer hexagon screw head 311 of the fastening bolt 31 is clamped into the large hole part of the right primary stepped hole 121 of the previous guide wheel 1, and at the same time, the fastening screw 312 of the fastening bolt 31 passes through the small hole part of the right primary stepped hole 121 of the previous guide wheel 1 and then is inserted into the left primary stepped hole 111 of the next guide wheel 1. Next, the positioning nut 32 is placed in the large hole part of the left primary stepped hole 111 of the next guide wheel 1, and the positioning nut 32 is screwed by a screwdriver inserted into the positioning inner hexagon notch 322, so that the fastening screw 312 is screwed into the positioning female threaded blind hole 321 of the positioning nut 32. Subsequently, spacer rings 34 are respectively sleeved outside the front and rear guide wheels 1, and the annular flange 341 of spacer ring 34 located on the front guide wheel 1 is inserted into the right secondary stepped hole 122 along the right slot 123, and then the annular flange 341 of spacer ring 34 located on the rear guide wheel 1 is inserted into the left secondary stepped hole 112 along the left slot 113. Finally, the auxiliary bolts 33 are respectively placed into the right secondary stepped hole 122 located on the previous guide wheel 1 and the left secondary stepped hole 112 located on the latter guide wheel 1, and then the auxiliary bolts 33 are screwed by the screwdrivers inserted into the auxiliary inner hexagon notch 3311, so that the auxiliary screws 332 of the auxiliary bolts 33 are respectively screwed into the corresponding blind holes 3111 of the fastening outer hexagon screw head 311 and the positioning internal thread through holes 323 of the positioning nut 32.

The above embodiment is an illustration of the present application, not a limitation of the present application, and any scheme after simple transformation of the present application belongs to the protection scope of the present application.

The invention claimed is:

1. A steel belt guide wheel assembly made of nylon, comprising guide wheels (1) and bearings (2), wherein the guide wheels (1) are made of nylon and the left and right ends of a wheel surface are respectively provided with a left annular convex wall (11) and a right annular convex wall (12), and a belt groove (13) is formed between the left annular convex wall (11) and the right annular convex wall (12); the bearings (2) are coaxially installed in wheel body channels of the guide wheels (1), and the guide wheels (1) can be detachably connected in pairs by a connecting mechanism (3) or glued together by glue;

wherein the connecting mechanism (3) comprises a fastening bolt (31) and a positioning nut (32), and the left and right ends of the positioning nut (32) are respectively provided with a positioning internal thread blind hole (321) and a positioning inner hexagon notch (322); the fastening bolt (31) is provided with a fastening outer hexagon screw head (311) and a fastening screw (312), and one end of the fastening screw (312) is coaxially connected with the fastening outer hexagon screw head (311), and the other end can be screwed into the positioning internal thread blind hole (321); a left primary stepped hole (111) and a right primary stepped hole (121) are respectively arranged on the left annular convex wall (11) and the right annular convex wall (12);a large hole part of the left primary stepped hole (111) can be used for placing the positioning nut (32) and is arranged towards the belt groove (13); a large hole part of the right primary stepped hole (121) is in a shape of an inner hexagon adapted to the fastening outer hexagon screw head (311) and is arranged towards the belt groove (13), and small hole parts of the right primary stepped hole (121) and the left primary stepped hole (111) can be penetrated by the fastening screw (312).

2. The steel belt guide wheel assembly made of nylon according to claim 1, wherein the connecting mechanism (3) further comprises an auxiliary bolt (33), which comprises an auxiliary screw head (331) and an auxiliary screw (332); one end of the auxiliary screw head (331) is provided with an auxiliary hexagon notch (3311) while the other end is coaxially connected with the auxiliary screw (331); the fastening outer hexagon screw head (311) is provided with a fastening internal thread blind hole (3111) into which an auxiliary screw (332) can be screwed; the positioning nut (32) is provided with a positioning internal thread through hole (323) into which the auxiliary screw (332) can be screwed, and the left annular convex wall (11) and the right annular convex wall (12) are respectively with a left secondary stepped hole (112) and a right secondary stepped hole (122) into which the auxiliary bolt (33) can be placed.

3. The steel belt guide wheel assembly made of nylon according to claim 2, wherein the bearing (2) comprises an inner ring (21), an outer ring (22), a cover (23), balls (24) and a retainer (25); the inner ring (21) is coaxially sleeved in a ring channel of the outer ring (22), and the outer ring (22) is coaxially fixed in the wheel body channel of the guide wheel (1); the balls (24) are rotatably connected between the inner ring (21) and the outer ring (22) through the retainer (25), and the left and right ends of the inner ring (21) and the outer ring (22) are respectively closed by the cover (23).

4. The steel belt guide wheel assembly made of nylon according to claim 3, wherein the cover (23) is sealed by a sealing ring.

5. The steel belt guide wheel assembly made of nylon according to claim 2, wherein the positioning internal thread through hole (323) is communicated with the positioning inner hexagon notch (322).

6. The steel belt guide wheel assembly made of nylon according to claim 5, wherein the bearing (2) comprises an inner ring (21), an outer ring (22), a cover (23), balls (24) and a retainer (25); the inner ring (21) is coaxially sleeved in a ring channel of the outer ring (22), and the outer ring (22) is coaxially fixed in the wheel body channel of the guide wheel (1); the balls (24) are rotatably connected between the inner ring (21) and the outer ring (22) through the retainer (25), and the left and right ends of the inner ring (21) and the outer ring (22) are respectively closed by the cover (23).

7. The steel belt guide wheel assembly made of nylon according to claim 6, wherein the cover (23) is sealed by a sealing ring.

8. The steel belt guide wheel assembly made of nylon according to claim 5, wherein the connecting mechanism (3) further comprises a spacer ring (34), which is sleeved outside the guide wheel (1) and clings to one side of the left annular convex wall (11) and/or the right annular convex wall (12) facing the belt groove (13).

9. The steel belt guide wheel assembly made of nylon according to claim 8, wherein the bearing (2) comprises an inner ring (21), an outer ring (22), a cover (23), balls (24) and a retainer (25); the inner ring (21) is coaxially sleeved in a ring channel of the outer ring (22), and the outer ring (22) is coaxially fixed in the wheel body channel of the guide wheel (1); the balls (24) are rotatably connected between the inner ring (21) and the outer ring (22) through the retainer (25), and the left and right ends of the inner ring (21) and the outer ring (22) are respectively closed by the cover (23).

10. The steel belt guide wheel assembly made of nylon according to claim 8, wherein an annular flange (341) is arranged on the spacer ring (34), a side body through hole is arranged on the annular flange (341), and the left annular convex wall (11) and the right annular convex wall (12) are respectively with a left slot (113) and a right slot (123) which are communicated with the left secondary stepped hole (112) and the right secondary stepped hole (122).

11. The steel belt guide wheel assembly made of nylon according to claim 10, wherein the bearing (2) comprises an inner ring (21), an outer ring (22), a cover (23), balls (24) and a retainer (25); the inner ring (21) is coaxially sleeved in a ring channel of the outer ring (22), and the outer ring (22) is coaxially fixed in the wheel body channel of the guide wheel (1); the balls (24) are rotatably connected between the inner ring (21) and the outer ring (22) through the retainer (25), and the left and right ends of the inner ring (21) and the outer ring (22) are respectively closed by the cover (23).

12. The steel belt guide wheel assembly made of nylon according to claim 10, wherein the left slot (113) and the right slot (123) are respectively communicated with the small holes of the left secondary stepped hole (112) and the right secondary stepped hole (122).

13. The steel belt guide wheel assembly made of nylon according to claim 12, wherein the bearing (2) comprises an inner ring (21), an outer ring (22), a cover (23), balls (24) and a retainer (25); the inner ring (21) is coaxially sleeved in a ring channel of the outer ring (22), and the outer ring (22) is coaxially fixed in the wheel body channel of the guide wheel (1); the balls (24) are rotatably connected between the inner ring (21) and the outer ring (22) through the retainer (25), and the left and right ends of the inner ring (21) and the outer ring (22) are respectively closed by the cover (23).

14. The steel belt guide wheel assembly made of nylon according to claim 1, wherein when the guide wheels (1) are sequentially glued together by glue in pairs, the end faces of the left and right ends of the guide wheels (1) are respectively provided with grid grooves (14).

15. The steel belt guide wheel assembly made of nylon according to claim 14, wherein the bearing (2) comprises an inner ring (21), an outer ring (22), a cover (23), balls (24) and a retainer (25); the inner ring (21) is coaxially sleeved in a ring channel of the outer ring (22), and the outer ring (22) is coaxially fixed in the wheel body channel of the guide wheel (1); the balls (24) are rotatably connected between the inner ring (21) and the outer ring (22) through the retainer (25), and the left and right ends of the inner ring (21) and the outer ring (22) are respectively closed by the cover (23).

16. The steel belt guide wheel assembly made of nylon according to claim 1, wherein the bearing (2) comprises an inner ring (21), an outer ring (22), a cover (23), balls (24) and a retainer (25); the inner ring (21) is coaxially sleeved in a ring channel of the outer ring (22), and the outer ring (22) is coaxially fixed in the wheel body channel of the guide wheel (1); the balls (24) are rotatably connected between the inner ring (21) and the outer ring (22) through the retainer (25), and the left and right ends of the inner ring (21) and the outer ring (22) are respectively closed by the cover (23).

17. The steel belt guide wheel assembly made of nylon according to claim 16, wherein the cover (23) is sealed by a sealing ring.

18. The steel belt guide wheel assembly made of nylon according to claim 1, wherein the bearing (2) comprises an inner ring (21), an outer ring (22), a cover (23), balls (24) and a retainer (25); the inner ring (21) is coaxially sleeved in a ring channel of the outer ring (22), and the outer ring (22) is coaxially fixed in the wheel body channel of the guide wheel (1); the balls (24) are rotatably connected between the inner ring (21) and the outer ring (22) through the retainer (25), and the left and right ends of the inner ring (21) and the outer ring (22) are respectively closed by the cover (23).

19. The steel belt guide wheel assembly made of nylon according to claim 18, wherein the cover (23) is sealed by a sealing ring.

* * * * *